March 2, 1965    E. F. WANTLAND    3,171,292
ACTUATOR DEVICE; ELECTRO-PISTON
Original Filed June 6, 1960

INVENTOR.
Edward F. Wantland 3,171,292
ACTUATOR DEVICE; ELECTRO-PISTON
Edward F. Wantland, 326-R San Vicente Blvd.,
Santa Monica, Calif.
Original application June 6, 1960, Ser. No. 34,004, now Patent No. 3,066,304, dated Dec. 4, 1962. Divided and this application Sept. 28, 1962, Ser. No. 227,685
9 Claims. (Cl. 74—472)

This is a division of my earlier application Serial No. 34,004, filed June 6, 1960, now Patent No. 3,066,304.

This actuator relates to a motivating mechanism to push and/or pull devices which are ordinarily motivated by air cylinder means being powered from an air compressor.

The air cylinder devices require bulky air compressors which are difficult to transport and are heavy to move. It is therefore beneficial to have a self-contained and easily portable mechanism of light weight with flexibility of operation.

It is the object of this invention to provide a light weight and simple flexibly operating means to accomplish the results now requiring additional heavy and expensive compressor equipment.

It is another object to provide a power source operated by a rotary motor, such as an electric, hydraulic or air motor. The electric motor is preferred because it frees the device from dependences on a source of compressed fluid.

It is another object to enable the actuator to use electricity either from a power line, ordinary house current, a battery or other A.C. or D.C. source of electricity. Because electricity is available nearly everywhere, an electrically powered device is more convenient and cuts down the cost of equipment and operation needed to do the job. However, a rotary fluid motor could be used in this device, if desired.

The above and other features of this invention will be fully understood from the following detailed description and the accompanying drawings in which.

Figure 1:
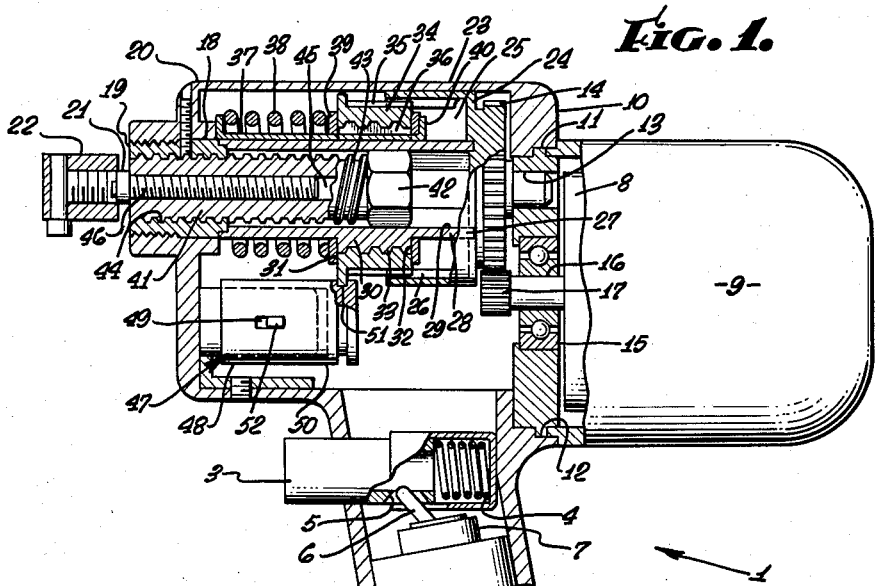
FIG. 1 is a side elevation, partly in cutaway cross-section of a presently-preferred embodiment of the invention.

FIG. 1 shows a tool 1 according to the invention. The tool may be provided with a hollow handle 2 for a handle grip with a switch button 3 projecting therefrom. A spring 4 loads the button outwardly from the handle. The button has a cavity 5 to receive the toggle 6 of a starter switch 7 which forms part of a circuit yet to be described. A reversible electric motor 8 is mounted in a case 9, and thus to a frame 10 which forms an extension of the handle. A bearing plate 11 fits in an opening 12 in the rear of the frame, and has a bore 13 to act as a bearing for a driven gear 14. A ball bearing 15 is fitted in the bearing plate, which journals motor shaft 16 which has a spur gear 17 inside the case to engage with and drive driven gear 14.

At the opposite end of the housing from the motor, there is an opening 18 through which projects a fixed nut 19 that is non-rotatively mounted to the frame. This fixed nut is held to the housing and restrained against rotation by a set screw 20 threaded through the frame and into the fixed nut.

The construction of actuating means 23 for providing axial reciprocatory motion has a driven gear 33 integral with a cup extension 24 which has within it an opening 25 with axial splines 26 therein. At the base of the cup there is an annular groove 27.

A driving cylinder 28 has its annular end in groove 27 so that it can spin free thereof. Driving cylinder 28 has a hexagonal passage 29 therein which is axially prismatic. The driving cylinder has a raised section 30 which provides a pair of shoulders 31, 32. This section between shoulders 31 and 32 carries threads 33. These threads have a very steep pitch, about 45°.

To threads 33, there is threadedly engaged a driving nut 34. Relative rotation between the driving nut and the driving cylinder will cause the driving nut to move axially relative to the driving cylinder.

The driving nut 34 has splines 35 on the exterior surface which engage with the splines in opening 25 so that rotation of driven gear 14 turns the driving nut.

Three slots 36 are formed in the driving cylinder between shoulders 31 and 32, and these pass a U-shaped retainer 37. There may preferably be three of these retainers spaced 120° apart. A spring 38 is held between one end of the retainer, and a washer 39, which washer is axially movable along the driving cylinder, but which is restrained in one direction by shoulder 31. A similar washer 40 is against shoulder 32 and is held against it by the other end of the U-shaped retainer.

Within hexagonal passage 29 there is a driving screw 41 which has a hexagonal head 42 so that it is driven by the driving cylinder. This driving screw has an exterior thread 43 which engages with interior threads 44 in the fixed nut 19 so that rotation of the driving cylinder will cause the driving screw to shift axially. A central threaded passage 45 is formed through the driving screw which has interior threads 46. These threads are of the opposite hand from exterior threads 43, and actuating screw 21 threads into threads 46. Pusher means 22 is held against rotation by the device being actuated. Because screw 21 is held against rotation by pusher means 22, this assembly is a differential screw such that screw 21 is moved out at a faster rate than the driving screw.

A switch 47 has an actuating sleeve 48 with a slot 49 therein. A projection 50 from the sleeve has a groove wherein the flanged rim 51 of the driving nut 34 can rotate. The sleeve is moved to the left so as to actuate switch toggle 52 when the driving nut is moved completely to the left, and moved to the right to actuate the switch toggle when the driving nut is moved completely to the right.

The operation of the actuating means should be evident from the drawings. When the motor is rotated by virtue of pressing the starter button 3, this would rotate the driving nut 34 clockwise if viewed from the motor toward the clinching means, the exterior thread 33 on the driving nut spirally clockwise and away from the point of view. The retainer 37 which has its right-hand end held against washer 40 causes the spring 38 to hold washer 39 against the driving nut, and this force is enough to keep the driving nut from axially moving along threads 33 at least so long as the driving cylinder 28 can turn relatively freely. Therefore, the driving nut 34 drives the driving cylinder 28 which in turn turns the driving screw 41 which moves in the threads of the fixed nut 19 thereby contributing one component of motion to the actuating screw, and its own rotation combined with the restraint against rotation of the actuating screw 21 causing an additional component of motion due to the opposite hands of the threads on the actuating screw. This type of motion continues until there is firm resistance to any further motion. Then further rotation of gear 14 will, because the driving cylinder can no longer turn, overcome the resistance of spring 38, causing the driving nut 34 to move axially relative to the driving cylinder, and contact the actuating sleeve 48 of switch 47. This will change the switching condition in the manner to be disclosed below, to permit reverse movement. When the starter button is released, the motor will reverse its direction, and the driving nut 34 will tend to be centered again, and also the actuating screw will be returned to the right in FIG. 1. The driving nut's rim flange will now move the switch actuating sleeve to reverse the switch toggle, thus reversing the switch to stop the motor. It is understood that movement of the actuating screw in FIG. 1 will cause screw 21 to move to actuate whatever device is connected to it.

Upon pressing starter button 3 in FIG. 1, the actuating means is started in operation and any pusher assembly begins to move to the left. Releasing starter button 3 reverses the operation to the original position.

The control circuit for operating the device and operation of the electrical actuating of FIG. 1 will now be described with particular relation to FIGS. 2-5. Switch 47 is a snap-acting, two-pole switch having a pair of blades 53, 54. Blade 53 has a common terminal 55 and switch contacts 56, 57. Blade 54 has a common terminal 58 and only one active switch contact 59. Motor 8 has commutator terminals 60, 61. The motor will be grounded in accordance with safety standards found in most codes. Motor 8 also has field terminals 62, 63.

It will be recognized that the motor will be run in opposite directions depending on which of its two terminals has the positive current at any instant. Switch 7 has two blades 64, 65. Blade 64 has a common terminal 66 and two switch contacts 69, 70. Blade 65 has a common terminal 71 and only one active switch contact, that is, contact 70, which it shares with blade 64. Switch 47 is snap-acting, depending on the position of driving nut 34, and the starter switch is also snap-acting, depending on the position of the switch button.

Figure 2:
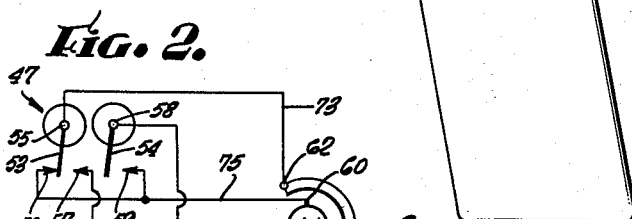
FIGS. 2-5 show the switch action in the circuitry for a control for the device of FIG. 1.

FIG. 2 shows the circuit in its repose (non-operating) condition with the starter switch released, and switch 47 at the position illustrated, that is, that which it assumes prior to operation of the device. Switch contact 69 is connected by a lead 72 to common terminal 58. Common terminal 55 is connected by lead 73 to field terminal 62. Common terminal 71 is connected by lead 74 to switch contact 57. Switch contact 56 is connected by lead 75 to commutator terminal 60 of the motor, and switch contact 70 is connected by lead 76 to commutator terminal 61 of the motor. Common terminal 66 is connected to one pole of a current source 67. Lead 68 connects the other pole to field terminal 63.

In the position shown in FIG. 2, positive instant current applied to the common terminal 66 is conducted to common terminal 58 of switch 47, but this switch is open, and therefore all power is off.

Figure 3:
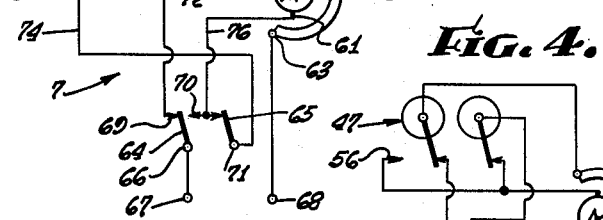
Figure 4:
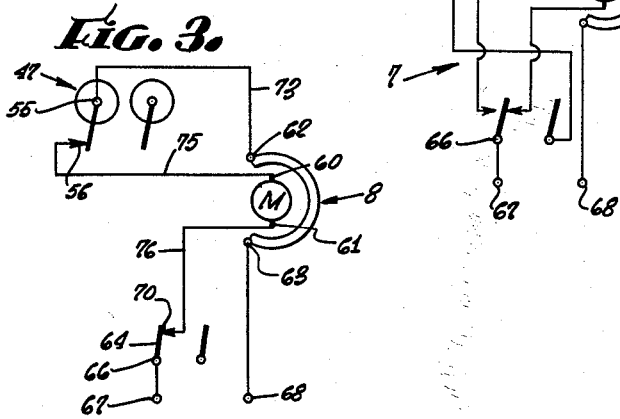

In FIG. 3 starter switch 7 has been switched over so that switch blade 64 connects common terminal 66 and switch terminal 70 to pass current through lead 76 to commutator terminal 61, and thence through lead 75, to switch contact 56, thence to common terminal 55, and thence through lead 73 to field terminal 62 and thence from field terminal 63 back to current source 67. This will operate the actuating screw to the left in FIG. 1. When the device has finally been set, switch 47 will reverse, as shown in FIG. 4, to stop the motor, even with the trigger closed. When the trigger is held closed, current is stopped at switch contact 56 and the motor is shut off.

Figure 5:
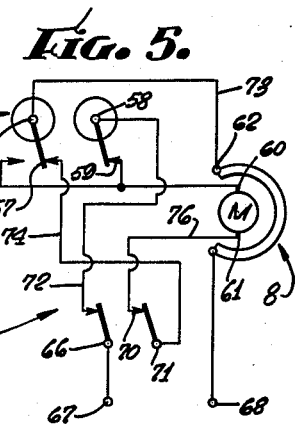

To reverse the actuating screw and reverse axial displacement, the start button is released as shown in FIG. 5. Then current from common terminal 66 passes to lead 72, thence through common terminal 58 to switch terminal 59, and thence to commutator terminal 60 of the motor, through lead 76, switch terminal 70, common terminal 71, lead 74, through switch contact 57, common terminal 55, and lead 73 to field terminal 62, and thence back to the current source, thereby reversing the motor. When the device is completely retracted, switch 47 switches over, and the circuit is returned to the repose condition of FIG. 2 and is ready for the next actuation.

While a differential screw has been shown, it is to be understood that a single screw could be used instead. This could be accomplished by making integral the actuating screw and driving screw, and threadedly engaging the actuating cylinder and driving screw, and deleting the thread, inside the fixed nut. Other means may also be used. It is to be understood that the electrical source is particularly suitable for powering a device of this type, but that it is not to be limited to electrical sources, it also being possible to substitute fluid pressure sources and even manual linkages, if desired.

This invention is not to be limited by the embodiments shown in the drawings and described in the description which are given by way of example and not of limitation, but only in accordance with the scope of the appended claims.

I claim:

1. Actuating means for providing axially reciprocating motion, said actuating means having an axis of reciprocal movement and comprising: a housing; a rotary motor mounted to said housing; a drive gear journaled to said motor; a driven gear journaled to said housing and driven by said drive gear; a spline drive section integral with the driven gear and having an axially splined opening; a driving nut; splines on said driving nut engaged in the axially splined opening; an interior thread in said driving nut; a driving cylinder rotatably journaled in said splined opening; an exterior thread on said driving cylinder, the driving nut being threaded onto said driving cylinder, said driving cylinder having an axially extended non-circular passage therein; a fixed nut axially and non-rotatably mounted to the housing and having a threaded opening therethrough; a driving screw having a non-circular exterior portion in said driving cylinder so as to be rotated by the same and also having exterior threads of one hand engaged to the fixed nut, and a passage having interior threads of the other hand; and an actuating screw within the driving screw and threaded to the threads of the other hand, said actuating screw being adapted to be restrained against rotation; and springing means tending to hold the driving nut centered on the threads on the driving cylinder, resistance to movement of the actuating screw enabling the driving nut to overrun the driving cylinder to stop causing the latter to rotate and to permit reversal of motion upon reversal of motor rotation.

2. Actuating means according to claim 1 in which the springing means comprises a pair of washers axially slidable on the driving cylinder, a spring bearing against a first one of said washers; and a U-shaped retainer restraining said spring and pressing against the second one of said washers to permit spring compression in either direction.

3. Actuating means according to claim 1 in which a first switch can be actuated by the driving nut, and a starter switch is actuated by the operator, and circuit means for causing the motor to extend the actuating screw when the starter switch is operated until the first switch is actuated, and thus cause the motor to reverse its rotation when the starter switch is released.

4. Actuating means for providing axially reciprocating motion, said actuating means having an axis of reciprocating movement and comprising: a housing; a rotary motor mounted to said housing; a drive gear journaled to said motor; a driven gear journaled to said housing and driven by said drive gear; a spline drive section integral with the driven gear and having an axially splined opening; a driving ring or driving nut; axially splined opening; internal projections in the said driving ring; a driving cylinder rotatably journaled in said splined opening; exterior helically splined channels on said driving cylinder, the internal projections of the driving ring being engageable in the channels on the driving cylinder, said driving cylinder having an axially extending non-circular passage therein; a fixed nut axially and non-rotatably mounted to the housing and having a threaded opening therethrough; a driving screw having a non-circular exterior portion in said driving cylinder so as to be rotated by the same and also having exterior threads of one hand engaged to the fixed nut, and a passage having interior threads of the other hand; and an actuating screw within the driving screw and threaded to the threads of the other hand, said actuating screw being restrained against rotation; and springing means tending to hold the driving ring centered in a location on the driving cylinder, resistance to movement of the actuating screw enabling the driving ring to overrun the driving cylinder to stop causing the latter to rotate and to permit reversal of motion upon reversal of motor rotation.

5. Actuating means according to claim 4 in which the springing means comprises a pair of washers axially slidable on the driving cylinder, a spring bearing against first of said washers; and a retainer having U-shaped members restraining said spring and the driving member and pressing against the second of said washers.

6. Actuating means according to claim 4 in which a first switch is actuated by the driving ring, and a starter switch is actuated by the operator, and circuit means for causing the motor to extend the actuating screw until the first switch is actuated, and then cause the motor to reverse when the starter switch is released.

7. Actuating means having an axis, for providing axially reciprocating motion, said actuating means having an axis of reciprocal movement and comprising: a housing; a rotary motor mounted to said housing; a drive gear journaled to said motor; a driven gear journaled to said housing and driven by said drive gear; a spline drive section integral with the driven gear and having an axially splined opening; a driving nut; splines on said driving nut engaged in the axially splined opening; an interior thread in said driving nut; a driving cylinder rotatably journaled in said splined opening; an exterior thread on said driving cylinder, the driving nut being threaded onto said driving cylinder; a driving screw restrained against rotation and threaded to the driving cylinder for axial reciprocation and springing means tending to hold the driving nut centered on the threads on the driving cylinder, resistance to movement of the actuating screw enabling the driving nut to overrun the driving cylinder to stop causing the latter to rotate and to permit reversal of motion upon reversal of motor rotation.

8. Actuating means having an axis, for providing reciprocating motion, said actuating means having an axis of reciprocal movement and comprising: a housing, a rotary motor mounted to said housing; a drive gear journaled to said motor; a driven gear journaled to said housing and driven by said drive gear; a spline drive section integral with the driven gear and having an axially splined opening; a driving member; said driving member slidably engaged in the axially splined opening; a driving cylinder rotatably journaled in said splined opening; the driving member also being slidable engaged with the driving cylinder; a driving screw restrained against rotation and threaded to the driving cylinder for axial reciprocation and springing means tending to hold the driving means centered on the driving cylinder, resistance to movement of the actuating screw enabling the driving means to overrun the driving cylinder to stop causing the latter to rotate and to permit reversal of motion upon reversal of motor rotation.

9. An actuating means having an axis for providing reciprocating motion, said actuating means having an axis of reciprocal movement and comprising: a housing; a rotary motor mounted to said housing; a drive gear means affixed to said motor to drive said reciprocal actuating means; switching means to start operation of the motor; switching means to stop operation of the motor; and switching means to reverse the direction of motor operation.

References Cited by the Examiner

UNITED STATES PATENTS 3,066,304  12/62  Wantland _____ 1—187

FOREIGN PATENTS 455,957  3/50  Italy.

BROUGHTON G. DURHAM, *Primary Examiner*.